Sept. 27, 1960     H. KUHLMANN     2,954,078
VEHICLE SEAT
Filed Feb. 13, 1957     5 Sheets-Sheet 2
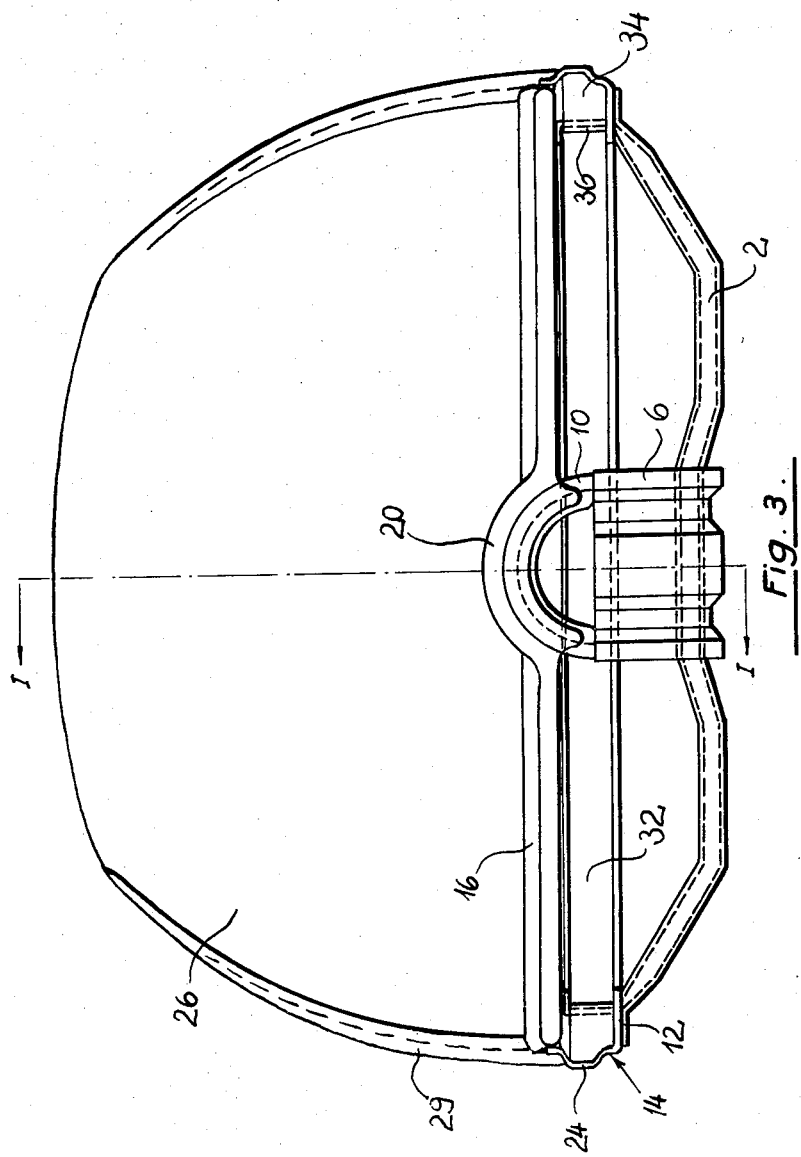

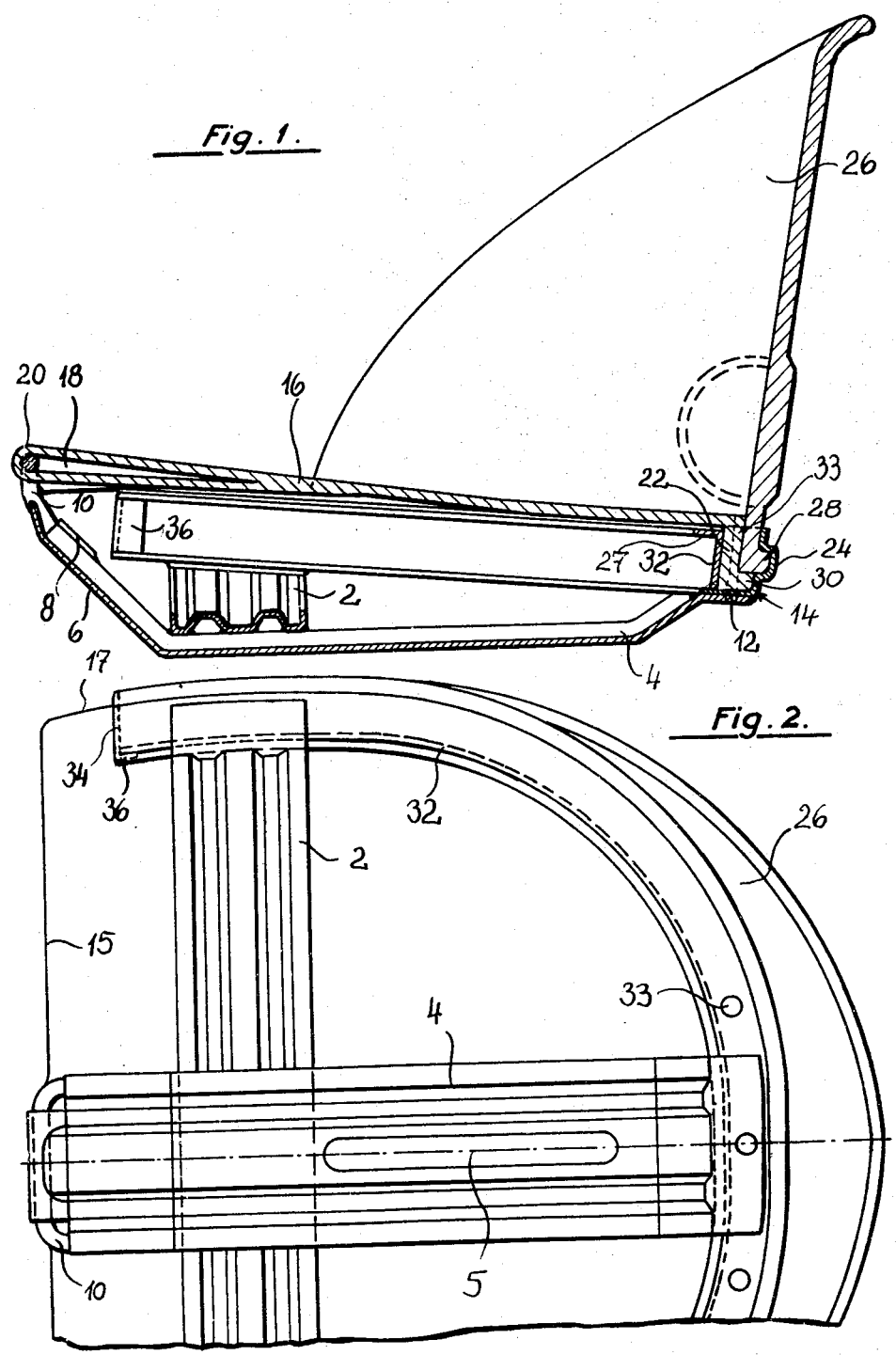

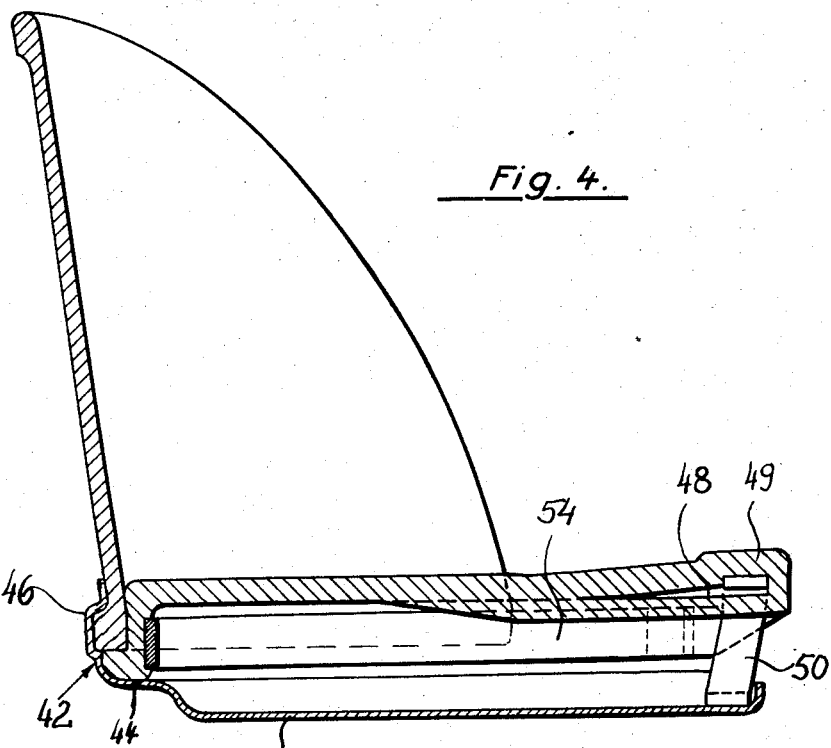
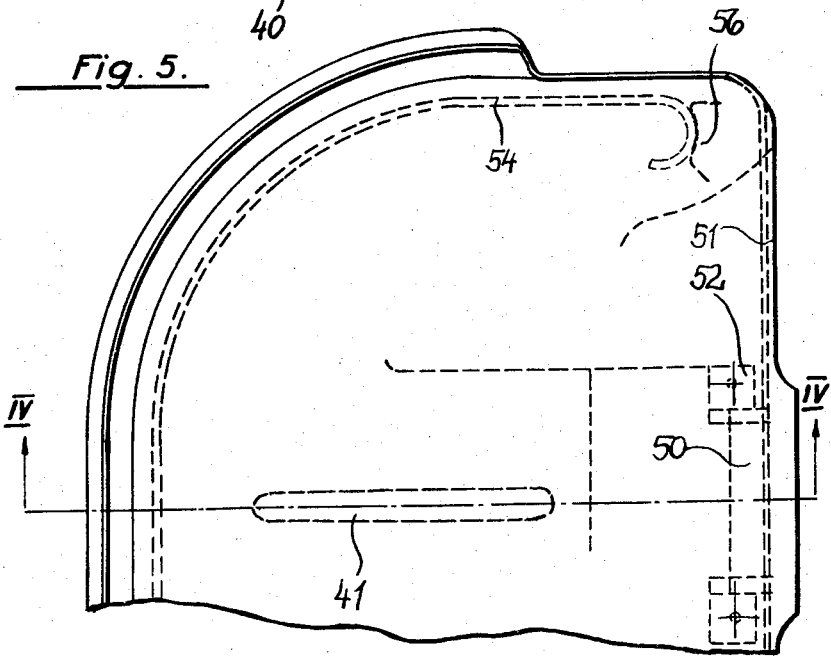

Sept. 27, 1960 H. KUHLMANN 2,954,078
VEHICLE SEAT
Filed Feb. 13, 1957 5 Sheets-Sheet 4
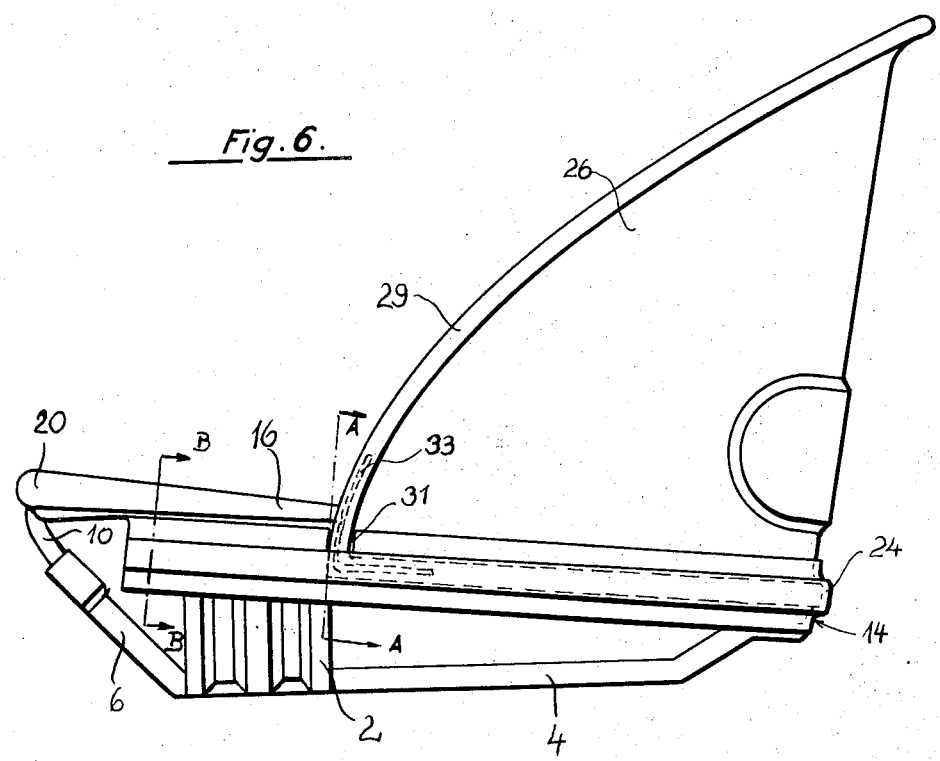
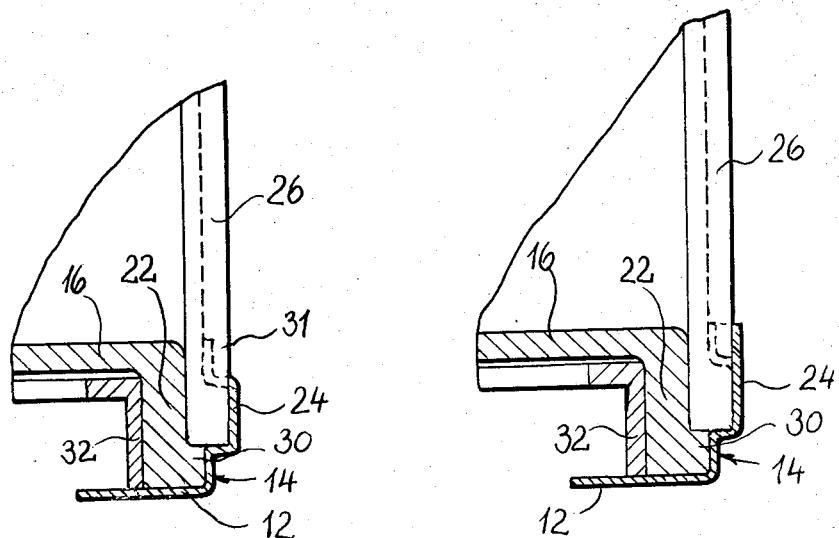

Sept. 27, 1960   H. KUHLMANN   2,954,078
VEHICLE SEAT

Filed Feb. 13, 1957   5 Sheets-Sheet 5

INVENTOR.

BY

United States Patent Office 2,954,078
Patented Sept. 27, 1960

2,954,078

VEHICLE SEAT

Heinz Kuhlmann, Bielefeld, Germany, assignor to Kek Seat Corporation, Baldwin, N.Y.

Filed Feb. 13, 1957, Ser. No. 639,967

Claims priority, application Germany Feb. 15, 1956

8 Claims. (Cl. 155—191)

The invention relates to vehicle seats and refers more particularly to an improved mounting for the seat of operators of tractors and the like.

The present invention contemplates an improved seat assembly where the seat cover is held at its rear and lateral edges by continuous supporting elements and is engaged at the center of its front edge by another supporting element; a plate-shaped elastic back embraces the rear edge and at least part of the lateral edges of the seat and is secured to said continuous supporting elements; the supporting elements are mounted on a frame with which the seat is secured to the vehicle.

It is a principal object of the invention to provide a seat structure of the character described, wherein the seat and the back are mounted in a very simple manner and which consists of a minimum number of members.

It is another object of the invention to provide a seat which can be mounted in a minimum of time.

Other objects and advantages will be apparent from a consideration of the specification and claims.

According to the invention, the supporting elements for the rear edge and the lateral edges of the seat cover have an upwardly directed part, which is provided with a groove extending in the circumferential direction of the seat cover, and the seat cover and/or the back are provided with a corresponding bead which engages said groove; means are provided which keep said bead and groove in engagement.

The bead is preferably disposed on the outside of the back at its lower edge. The seat cover, which is designed as a simple plate cover, may be provided with a downward extension carrying the bead; in a preferred embodiment of the invention, said bead extends under the lower edge of the back and thus holds the seat cover.

Various embodiments of the invention are illustrated, by way of example, in the accompanying drawings, wherein—

Fig. 1 shows a seat structure according to the invention in a section taken along line 1—1 of Fig. 3;

Fig. 2 is a bottom elevational view of the seat according to Fig. 1;

Fig. 3 is a front elevational view of the seat according to Fig. 1;

Fig. 4 is a longitudinal sectional view taken along the line IV—IV of Fig. 5;

Fig. 5 is a top elevational view of the seat according to Fig. 4;

Fig. 6 is a side elevational view showing a modified back portion of a seat according to the invention;

Figs. 7 and 8 are sectional views of two embodiments of the supporting element at the front edge of the back portion;

Figure 9:
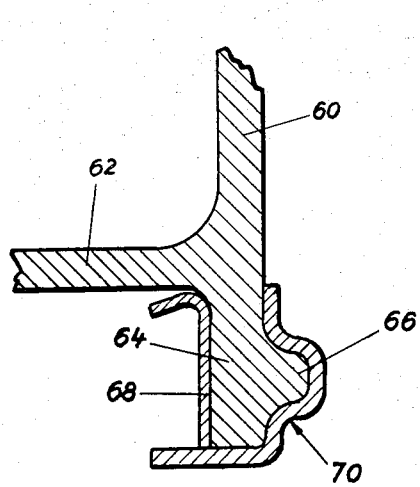
Fig. 9 shows in a partial section an embodiment where the back is integral with the seat.

In the embodiment of the invention according to Figs. 1 to 3, the supporting frame of the seat is formed by two profiled bands 2, 4, which cross each other and are rigidly connected at their crossing point, for example by spot welding. In the upwardly directed front portion 6 of the band 4, a tongue 8 forms two tubular recesses, in which the front supporting frame member 10 is inserted. The other arms of the supporting frame are each rigidly connected with the horizontal portion 12 of an angular supporting element 14, which extends in a U-bend around the rear edge and a substantial part of the lateral edges of the seat cover 16. The seat cover 16, which consists preferably of rubber, is provided in the center of the front edge with a loop 18 engaged by the supporting frame member 10. Said member 10 is U-shaped and forms in the center of the front edge an upwardly projecting nose 20 (Fig. 3). Between the nose 20 and the front ends of the supporting element 14, the front edge 15 of the cover is arranged without support, so that it is easily pressed down by the thighs of the operator, whereby the nose 20 offers a saddle-like support for the legs. Due to the fact that also the seat plate projects for a limited distance freely over the front ends of the supporting element 14, (at 17 in Fig. 2), the front edge of the cover can bend down under load. In this way, the front edge of the seat cover 16 is prevented from cutting into the thighs.

In the area of the supporting element 14, the seat cover 16 is provided with a downwardly extending portion 22. The supporting element 14 has an upwardly extending portion 24 provided with a groove arranged approximately at its half-way line and extending over the entire length of the supporting element 14.

The seat is also provided with a back 26, which is designed in the form of a plate and which consists preferably of rubber or another suitable elastic material. The back extends along the rear edge and at least part of the lateral edges of the base. The back carries at its lower edge an outwardly projecting bead 28, whose shape corresponds to the shape of the groove in the portion 24 and engages said groove. The downwardly extending portion 22 of the seat cover 16 carries at its lower end an outwardly projecting bead 30 which engages the lower edge of the back. Said portion 22 of the seat cover and the lower edge of the back 26 are pressed by a tensioning ring 32 against the portion 24 of the supporting element 14, which thus holds the bead 28 in engagement with the groove in the portion 24 and the bead 30 in engagement with the groove formed between the lower edge of the seat cover and the horizontal portion of the supporting element 14.

The ring 32 can be formed from a simple flat sheet. In the represented embodiment, it has an angular form, with the horizontal leg 27 extending under the seat cover 26. This way, cutting of the clamp into the edges of the horizontal plate of the seat cover and the portion 22 is avoided. The clamp is held in its clamping position by suitable means, for example by a metal plate 34 arranged at the front ends of the supporting element 14 which is flanged at 36 after the clamp has been inserted. Obviously, it is also possible to press out from the horizontal portion 12 of the supporting element 14 suitable noses between which the clamp is fixed.

Since the seat cover often slopes rearwardly, means must be provided, by which accumulated water can be removed. To this end, a few drain holes may be arranged in the back portion at the level of the seat cover, preferably such holes 33 extend vertically downward between the vertical portion 22 of the seat cover and the back, for example as indicated by the broken lines in Fig. 1. These holes can be either vulcanized into the respective members, or they can be bored subsequently.

In the modification shown in Figs. 4 and 5, the supporting frame consists of a pan-shaped member 40 integral with the supporting member 42, which consists of the horizontal arm 44 and the upturned vertical extension 46. Also in this embodiment, a seat cover is used which is provided in the center of the front edge with a loop 48 which is engaged by a clamp 50 serving at the same time as a structural element for the nose 49 in the front edge 51 of the seat covering. Said clamp 50 consists of a flat iron and is riveted to the member 40 with the bent-off arms 52 of its downwardly extending legs.

As a tensioning band 54, I use here a simple flat iron. The front end of the band is bent off in a curve and lies in the clamping position behind a nose 56 pressed out from the pan-shaped member 40.

The profiled band 4 of the supporting frame in the embodiment according to Figs. 1 and 3, and the member 40 in the embodiment according to Figs. 4 and 5, are provided with suitable means by which the seat can be connected through the supporting frame with the vehicle or also with a suitable spring frame of known design. For this purpose preferably an oblong hole 5 or 41 respectively is provided, which may be arranged approximately in the axis of the seat. Of course, additional fastening holes may also be provided in the legs of the band 2 or in the corresponding parts of the member 40, if this should prove necessary.

The fastening of the front edge of the back portion 26, which is one of the most highly stressed areas, presents a specific problem. Figs. 6 to 8 show possibilities of reinforcing the back at this point without impairing in any way the advantages of the invention. As it will be seen from Fig. 6, the back 26 is provided along its edge at the outside with a reinforcement 29 which preferably at the front edge of the back passes into the bead at the lower rim. The thickness of this reinforcement is preferably so selected that it corresponds, at least at the transition point into the bead, to the thickness of said bead. The width of the reinforcement 29 can be dimensioned as required. In order to make the above-mentioned passage of the reinforcement 29 into the holding bead possible, the vertical portion 24 of the supporting element 14 can be provided in the region above the groove with a cutout 31 which makes it possible to let the reinforcement 29 pass into the bead 28 without any loss of thickness. Instead of a cutout, this region may also be provided with a corresponding bend perpendicular to the groove of the leg 24 receiving the bead. Figs. 7 and 8 show on an enlarged scale the two possibilities. Fig. 7 shows the embodiment with the cutout, and Fig. 8 the one with the bend.

Due to the unreduced transition of the reinforcement 29 into the bead 28, it is now possible to insert without any difficulties in this region, a reinforcement in the form of a wire or the like, which extends angularly with its one leg into the reinforcement 29 and with its other leg into the bead 28. Such a reinforcement is indicated at 33 in Fig. 6.

Figure 12:
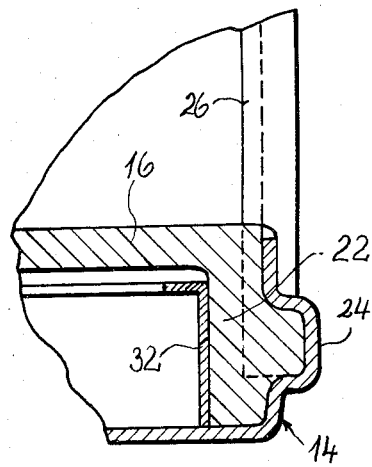
Fig. 12 is a sectional view taken along the line B—B of Fig. 6.

As will be noted from Fig. 12, in the area in front of the front edge of the back portion, the down-turned portion of the seat cover may be so designed that the profile conforms in the other areas by the combination of the lower edge of the back portion carrying the bead 28, with the portion 22 carrying the bead 30. In this way, it is possible to give to the supporting element the same profile over the entire length.

Figure 10:
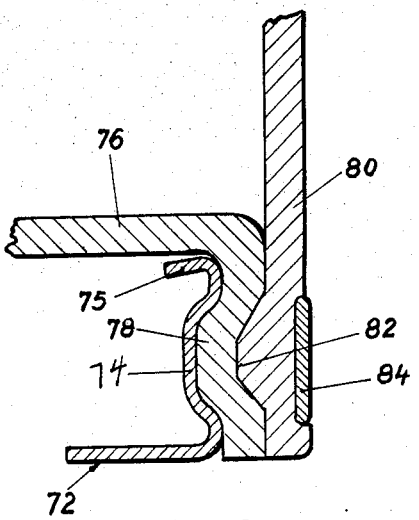
Fig. 10 shows an embodiment where the supporting bar is arranged on the inside of the seat cover and a clamping band is arranged at the outside thereof.
Figure 11:
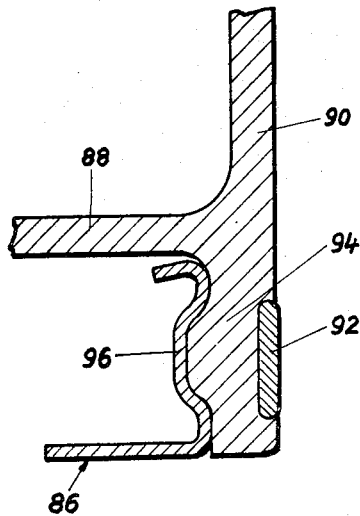
Fig. 11 shows an embodiment of the fastening similar to that in Fig. 10, but in a design where the seat cover and the back are again made of one piece.

Figs. 9 to 11 show other embodiments of the invention. Fig. 9 shows an embodiment where the back 60 and the seat cover 62 are made of one piece. The back and the seat cover have a common downwardly extending portion 64 which carries on its outside a bead 66, which under the action of a clamp or tensioning strap 68 is pressed into the corresponding groove of the supporting element 70.

Fig. 10 shows another embodiment, where the supporting element 72 is arranged at the inside of the seat cover. The vertical portion 74 is provided with an inwardly pressed groove. At the upper end, said portion 74 is angularly bent to form a horizontal arm 75, which, as described above, serves to prevent cutting into the seat cover. The seat cover 76 is provided with a downwardly extending portion 78 which has a bead at its inside and a groove at its outside, the bead and the groove preferably corresponding to each other, so that a kind of crank is formed. The groove at the outside of this portion 78 is engaged by a corresponding bead 82 of the back portion 80. The clamp or tensioning strap 84 serves to keep the parts engaged.

Fig. 11 shows an embodiment similar to Fig. 10, where the supporting element 86 is again arranged at the inside. Here the seat cover 88 is integral with the back 90, as in Fig. 9. At the outside, there is again provided a clamp or tensioning strap which keeps the bead 94 engaged with the vertical portion 96 of the supporting element 86.

As in Figs. 1 to 3, the supporting elements 70, 72, 86 in Figs. 9 to 11 may be separate members which are fastened on the supporting frame. But it is also possible to design them as parts of a single-piece pan-shaped element corresponding to the embodiment of Figs. 4 and 5.

As will be seen from the foregoing specification and the drawing, the invention provides a seat which meets in an ideal manner the requirements with regard to simple manufacture and assembly, but which, in addition, also has a greater strength compared to known seat structures, particularly as far as the fastening of the seat cover and of the back on the supporting frame is concerned.

The seat is assembled in a simple manner by bringing the flexible back and the seat cover in engagement with the supporting elements, whereupon the clamp or tensioning strap is inserted and locked by simple manipulations. Subsequently, the cover is clamped by inserting the nose clamp. In this way, the use of rivets, screws and the like is completely eliminated in the assembly. Due to the fact that the beads extend over the entire fastening edge, local stress peaks, as they occur in fastening with rivets or the like, are avoided, because the stress is uniformly distributed over the entire circumference.

I claim:

1. In a vehicle seat assembly suitable for tractors and the like, a seat comprising a flexible base and a flexible back, a frame, a substantially U-shaped angular sheet member supporting the rear and sides of the outer edge of said base, said angular member having a horizontal and an upturned portion, the horizontal portion being secured to said frame and open towards the front of the seat, a circumferential groove in said upturned portion, a horizontally projecting bead on said seat engaging said groove, and means holding said bead and groove in engaged position.

2. A vehicle seat assembly as defined in claim 1, wherein said base portion and back portion of the seat are integral with each other.

3. In a vehicle seat assembly suitable for tractors and the like, a seat comprising a flexible base sheet and a flexible back sheet, said back sheet extending along the rear edge and at least part of the lateral edges of said base sheet, a frame, a substantially U-shaped angular sheet member supporting the rear and sides of the outer edge of said base, said angular member having a horizontal and an upturned portion, the horizontal portion being secured to said frame and open towards the front of the seat, a circumferential groove in said upturned portion, a horizontally projecting bead on said back sheet engaging said groove, means holding said bead and groove in engaged position, and means on the front end of said frame supporting the central front portion only of said base sheet.

4. A vehicle seat as claimed in claim 3 wherein said base sheet is bent downwardly in contact with said back sheet and embraces the lower rim of said back sheet.

5. A seat assembly as defined in claim 3, wherein said bead is provided at the outside of said back sheet along the lower edge thereof.

6. A seat assembly as defined in claim 3, wherein said supporting means on the front end of the frame is a bracket and wherein said base sheet forms in the center of the front edge a loop engaged by said bracket.

7. A vehicle seat assembly as defined in claim 3, wherein said frame has a dish-like form and is integral with said supporting member.

8. In a vehicle seat assembly suitable for tractors and the like, a seat comprising a flexible base sheet and a flexible back sheet, the rear portion of said base sheet bent downwardly and joined to said back sheet by an interengaging rib and groove connection, a frame, a substantially U-shaped angular sheet member supporting the rear and sides of the outer edge of said base, said angular member having a horizontal and an upturned portion, the horizontal portion being secured to said frame and open towards the front of the seat, a circumferential groove in said upturned portion, a horizontally projecting bead in one of said joined sheets engaging said groove, means holding said bead and groove and said joined sheets in engaged position, and means on the front end of said frame supporting the central front portion only of said base sheet.

References Cited in the file of this patent

UNITED STATES PATENTS

| | | |
|---|---|---|
| 604,955 | Avery | May 31, 1898 |
| 957,411 | Christensen | May 10, 1910 |
| 1,186,910 | Kilburn | June 13, 1916 |
| 1,256,726 | Pike | Feb. 19, 1918 |
| 1,756,182 | Drane | Apr. 29, 1930 |
| 1,900,769 | Schemmel | Mar. 7, 1933 |
| 2,266,896 | Nordmark | Dec. 23, 1941 |
| 2,350,679 | Hann | June 6, 1944 |
| 2,354,728 | Asaro | Aug. 1, 1944 |
| 2,410,727 | Furbish | Nov. 5, 1946 |
| 2,509,580 | Smith | May 30, 1950 |
| 2,703,135 | Leatherman | Mar. 1, 1955 |

OTHER REFERENCES

Schurmann, German application 17,274, May 30, 1956.